US006412761B1

(12) United States Patent
Baudendistel et al.

(10) Patent No.: US 6,412,761 B1
(45) Date of Patent: Jul. 2, 2002

(54) HYBRID HYDRAULIC MOUNT WITH MAGNETORHEOLOGICAL FLUID CHAMBER

(75) Inventors: Thomas A. Baudendistel, Farmersville; Sanjiv G. Tewani, Lebanon; Mark W. Long, Bellbrook; James Eugene Dingle, Cincinnati, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/841,927

(22) Filed: Apr. 25, 2001

(51) Int. Cl.[7] ................................................. F16F 6/00
(52) U.S. Cl. ........................ 267/140.14; 267/140.15
(58) Field of Search ......................... 267/140.11–141.7

(56) References Cited

U.S. PATENT DOCUMENTS

| 4,872,652 A | * | 10/1989 | Rohner et al. ......... 267/140.11 |
| 4,925,162 A | * | 5/1990 | Kojima ................... 267/140.11 |
| 4,932,636 A | * | 6/1990 | Phillips et al. ......... 267/140.11 |
| 4,981,286 A | * | 1/1991 | Kato et al. .............. 267/140.11 |
| 4,991,826 A | | 2/1991 | Hoying et al. |
| 5,295,672 A | * | 3/1994 | Gugsch ................... 267/141.3 |
| 5,398,917 A | | 3/1995 | Carlson et al. |
| 5,499,799 A | * | 3/1996 | Kojima ................... 267/140.13 |

* cited by examiner

Primary Examiner—Christopher P. Schwartz
(74) Attorney, Agent, or Firm—Scott A. McBain

(57) ABSTRACT

A hydraulic mount assembly includes a body with a main chamber formed therein. A magnetorheological fluid retaining member is positioned in the main chamber forming a magnetorheological chamber adjacent the main chamber. An electrical coil is positioned adjacent the magnetorheological chamber and a plate member is operably connected to the magnetorheological fluid retaining member. Energization and de-energization of the coil controls the ability of the mount to resist movement by varying the apparent viscosity of the fluid within the magnetorheological chamber.

23 Claims, 2 Drawing Sheets

HYBRID HYDRAULIC MOUNT WITH MAGNETORHEOLOGICAL FLUID CHAMBER

TECHNICAL FIELD OF THE INVENTION

The present invention relates generally to hydraulic mounts for vibration damping and more particularly, to a hybrid hydraulic mount assembly wherein the apparent viscosity of a magnetic field controllable fluid in a chamber is changed to vary the ability of the mount to control movement. The controllable fluid is provided in a chamber isolated from a hydraulic fluid chamber in the mount.

BACKGROUND OF THE INVENTION

It is desirable to provide modern vehicles with improved operating smoothness with respect to damping and/or isolating the engine vibrations of the vehicle. In this respect, a variety of mount assemblies are presently available to isolate vehicle vibrations, such as for automobile and truck engines and transmissions. Currently, a great many vehicles incorporate mount assemblies that combine the advantageous properties of elastomeric materials with hydraulic fluids. A hydraulic mount assembly of this type typically includes a reinforced, hollow rubber body that is closed by a resilient diaphragm so as to form a cavity. This cavity separated into two chambers by a plate. The chambers are in fluid communication through a relatively large central orifice in the plate. The first or primary chamber is formed between the partition plate and the body. The secondary chamber is formed between the plate and the diaphragm.

The conventional hydraulic mount assembly can contain a decoupler positioned in the central orifice of the plate that reciprocates in response to vibrations. The decoupler movements alone accommodate small volume changes in the two chambers. At certain small vibratory amplitudes and high frequencies, fluid flow between the chambers is substantially avoided and hydraulic damping does not occur. In this manner, the decoupler functions as a passive tuning device.

In addition to the large central orifice, an outer track with a smaller flow passage is provided. The track in combination with the decoupler provides another passive tuning component. This assembly, in respect to small amplitude vibrating inputs, produces little or no damping. On the other hand, large amplitude inputs produce high-volume, high velocity fluid flow through the track, producing a high level of damping force and smoothing action. The operational characteristics of the hydraulic mount are entirely dependent upon the design of the orifice and track in addition to the characteristics of the damping fluid and elastomeric portions of the mount. As such, while varying amounts of damping are achieved with this design, changing the characteristics of the mount is not possible.

More recently, developments in hydraulic mount technology have led to the addition of electronic control of the mount. This type of mount represents an improvement over previous mounts in that it is responsive to sensed vehicle operating conditions. In this example, the mount provides an additional active tuning aspect. The tuning is accomplished by the use of a variable gate or valve for changing the size of the opening to the track between the two chambers thus controlling the flow of damping fluid therethrough.

An alternate approach to active tuning includes the use of an electro-rheological fluid (ER) or a magnetorheological (MR) fluid disposed in the first and second chambers. In this approach, a number of conductive plates form the partition between the chambers. The plates are provided with an electrical potential thus controlling the flow of fluid between the chambers. The plates of the partition include a number of small flow apertures. In this case some modulation of damping is possible.

It would be desirable to provide a hydraulic mount with continuously variable damping characteristics and active control with a reduced amount of a MR fluid.

SUMMARY OF THE INVENTION

One aspect of the present invention provides a hydraulic mount assembly including a body with a main chamber formed therein. A magnetorheological fluid retaining member is positioned in the main chamber forming a magnetorheological chamber adjacent the main chamber. An electrical coil is positioned adjacent the magnetorheological chamber and a plate member is operably connected to the magnetorheological fluid retaining member.

Other aspects of the present invention provide a plate member including a rim portion extending into the magnetorheological chamber. The rim portion can include a metallic portion. The rim portion can be spaced apart from the coil by a predetermined distance and cooperates with the coil to control a magnetic field generated by the coil when the coil is energized.

The plate member can be positioned to separate the main chamber into upper and lower sub-chambers. The plate member can include an inertia track passageway formed therethrough to allow fluid communication between the upper and lower sub-chambers. The plate member can include a valve to control fluid communication between the upper and lower sub-chambers. The valve can be one of a passive valve and an actively controlled valve.

The magnetorheological fluid retaining member can include an upper and lower skirt, each attached respectively to upper and lower surfaces of the plate member at one end, the upper skirt attached to the body at the other end. A ring member can be positioned along the body of the mount. The ring member can include a groove formed in an inner surface thereof, the groove adapted to house the coil therein and position the coil adjacent the rim of the plate member. The upper and lower skirts respectively attach to upper and lower surfaces of the ring member. The magnetorheological chamber can be formed between the upper and lower skirts and the ring member.

The plate member can include a passageway formed therethrough in communication with the upper and lower sub-chambers, the passageway having a greater length than width. The passageway can follow a tortuous path. The passageway can be made tunable to force fluid therethrough at a predetermined resonance.

The plate member can include a control valve, the control valve having an orifice in communication with the upper and lower sub-chambers. The control valve can be one of a passive valve and an active valve. The orifice of the control valve can be provided controllable to allow variable flow of mount fluid therethrough.

Another aspect of the present invention provides a hydraulic mount assembly including housing means for retaining mount fluid, means for retaining magnetorheological fluid, plate means for separating mount fluid with the housing means and means for controlling the movement of the plate.

Yet another aspect of the present invention provides a method of controlling the movement of a hydraulic mount including energizing and de-energizing a coil operably communicating with a magnetorheological fluid within an isolated chamber of the mount in response to a sensed signal and controlling movement of a plate member operably connected to the isolated chamber. In this manner the resistance of the mount to movement of an associated engine or transmission can be made controllable thereby.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
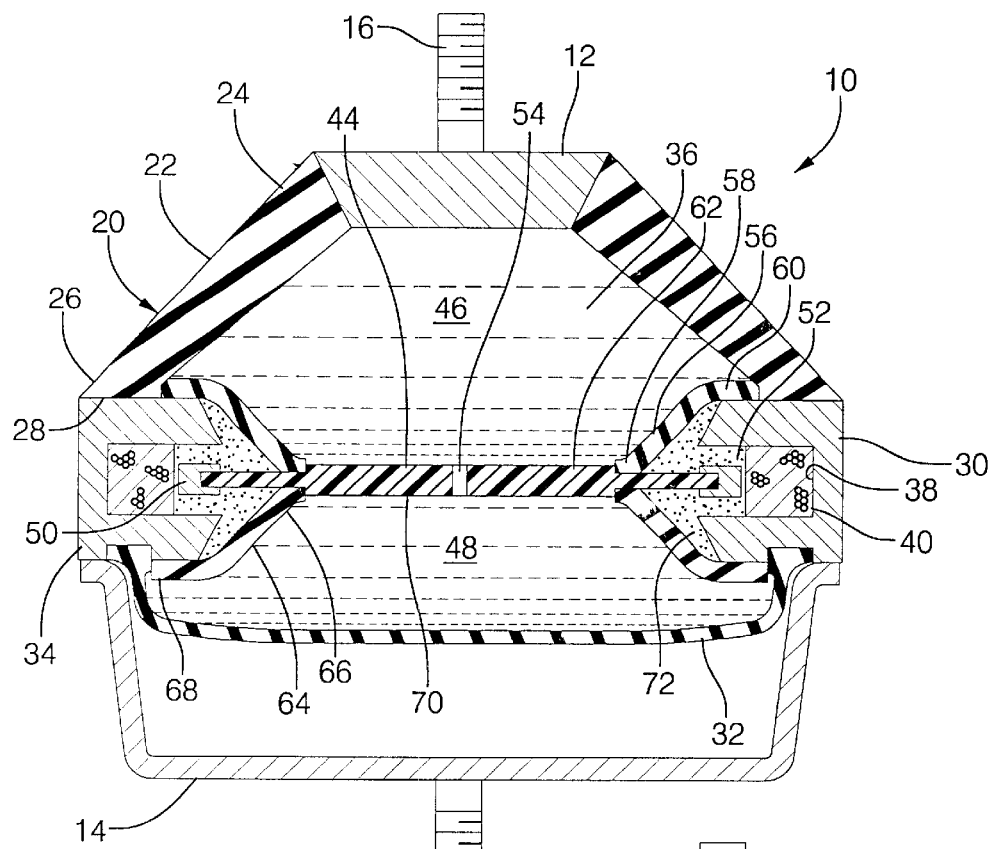
FIG. 1 illustrates a cross-sectional view of one embodiment of a MR mount of the present invention.

Referring to the drawings, illustrated in FIG. 1 is an embodiment of the MR mount 10 of the present invention. This mount assembly 10 is particularly adapted for mounting a component, such as an internal combustion engine or transmission to the frame of the vehicle. The mount assembly 10 can be used in applications other than engine or transmission mounts, where control of vibrations is desired.

The mount assembly shown in FIG. 1 can include a metal mounting member or insert 12 and a metal base plate 14. The insert 12 and base plate 14 can include a respective mounting stud 16, 18. The studs 16, 18 project outwardly from the insert 12 and base plate 14 for attachment respectively to an engine or transmission and an engine supporting cradle or frame member of a vehicle.

A hollow, flexible body 20 can generally interconnect the insert 12 and base plate 14. The body 20 can be formed of an elastomeric material, such as natural or synthetic rubber. In the illustrated embodiment, the body 20 can include an upper portion 22 comprising an elastomeric wall. The elastomeric wall 22 can attach at one end 24 to the metal insert 12. The other end 26 of the elastomeric wall 22 can attach to a first surface 20 gate of an orifice ring 30. The body 20 further includes or is closed by a diaphragm portion 32, which can be attached to a second surface 34 of the orifice ring 30. In this manner, the body 20 and diaphragm 32 generally defines a fluid chamber 36. The fluid chamber 36 contains a conventional hydraulic mount fluid such as glycol, as is known in the art.

The orifice ring 30 can include a groove 38 formed in an inner portion. An electromagnetic coil 40 is disposed in the groove 38. The coil 40 is electrically connected to a current driver (not shown), or the like, to produce a magnetic field depicted at 42. As is known in the art, a system controller (not shown) controls the driver. In one embodiment, the system controller takes the form of a microprocessor in a control circuit, which controls the current to the driver using sensed vehicle operating conditions and vibrations to determine the appropriate control action.

A disk shaped orifice plate 44 divides the fluid chamber 36 into an upper or "pumping" chamber 46 and a lower or "receiving" chamber 48. The orifice plate 44 can be formed of a rigid plastic or metal material. A metal ring or rim 50 can be located about the outer periphery of the orifice plate 44. The rim 50 can be positioned adjacent the coil 40 in the ring member 30 and spaced apart from the coil by a gap. A weep hole 54 formed through the orifice plate 44 in fluid communication with the upper chamber 46 and lower chamber 48 for temperature compensation can be formed at or near the center of the orifice plate. The weep hole 54 does not affect the overall operation of the mount 40.

The mount 10 is provided with a pair of annular elastomeric containment walls. The walls are provided in the form of upper and lower skirts or collars 56, 64. The upper skirt 56 includes an inner end 58 at the inner diameter, and an outer end 60 at the outer diameter. The inner end 58 of the upper skirt 56 is attached to an upper surface 60 to of the orifice plate 44 between the center weep hole 54 and rim portion for the of the plate. The outer end 60 of the upper skirt 56 can be attached to the first surface 28 of the ring member 30 adjacent the elastomeric wall.

The lower skirt 64 also includes an inner end 66 and an outer end 68. The inner end 66 of the lower skirt 64 can be attached to a lower surface 70 of the orifice plate between the center weep hole 54 and rim portion of 58 of the plate 44. The outer end 68 of the lower skirt 64 can be attached to the second surface 34 of the ring member 30 adjacent the diaphragm 32. In this manner, the upper and lower skirt 56, 64, together with the ring member 30, defines an annular MR chamber 72. The MR chamber 72 is filled with a MR fluid. Magnetorheological (MR) fluids comprise small soft-magnetic particles dispersed within a liquid carrier. Typical particles include carbonyl iron, or the like, having various shapes, but which can be spherical, and which exhibit mean dimensions of between about 0.1 to 500 micrometers. The carrier fluids include various known hydraulic oils, and the like. These MR fluids exhibit a thickening behavior (a rheology change), sometimes referred to as an "apparent viscosity change", upon being exposed to a magnetic field of sufficient strength. The higher the magnetic field strength to which the MR fluid is exposed, the higher the differential pressure (flow restriction or damping force) that can be achieved within the device.

The MR chamber 72 extends above and below the orifice plate 44 and in the gap 50 to between the rim 50 and coil 40. In this manner, when the coil 40 is energized, an electromagnetic field 42 extends through the MR fluid in the MR chamber 72.

In operation, stud 16 is attached to engine or transmission and stud 18 is attached to a frame portion of a vehicle. When the engine is at or near an idle speed, for example, small amplitude/low velocity vibrations are typically produced. These vibrations are detected and appropriate signals are sent to the controller. In response, the controller produces a signal that can result in a current being applied to the coil 40. When coil 40 produces little or no electrical fields the MR fluid produces very little shear resistance. As a result, the plate, the peripheral portion of which extends into the MR chamber 72, moves freely in response to changes in fluid pressure in chamber 46 and the mount 10 exhibits relatively soft characteristics that effectively isolate transfer of vibrations of the engine to the vehicle frame. In this case, primarily, the characteristics of the mount 10 are a function of the rheological properties of the elastomeric body portions 22, 32 of the mount, and the mount fluid contained therein.

As the mount 10 is exposed to an increase of vibrations, the increased load placed on the insert portion 12 of the mount 10 creates a condition of increased fluid pressure in the upper chamber 46. The fluid pressure in the upper chamber 46 urges the orifice plate 44 to move downwardly. The downward movement of the plate 44 causes increased pressure in the lower chamber 48 and resulting displacement or distension of the diaphragm 32. In the event that the coil 40 is not in an energized condition, the MR fluid in the MR chamber 72 does not resist the movement of the peripheral and rim 50 portions of the orifice plate 44. However, when the controller increases the current (and thus, the flux density of the magnetic field 42) in the coil 40 in response to the increased vibrations, the force to displace the MR fluid is increased. Accordingly, the movement of the orifice plate 44 is resisted proportionally with the current strength and resulting flux density 42 created by the coil 40. Thus, the resistance to movement of the mount 10 is continuously infinitely variable so as to match the operating conditions of the engine and provide an appropriate balance of motion isolation and control of engine movement.

Figure 2:
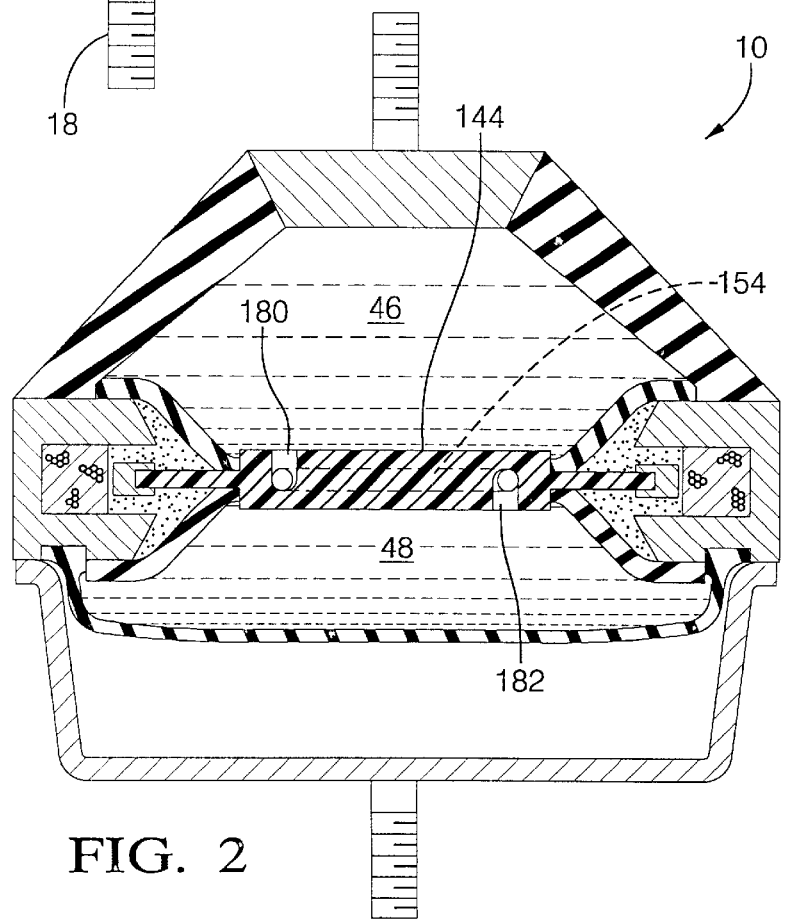
FIG. 2 illustrates a cross-sectional view of another embodiment of a MR mount of the present invention.

Referring to the drawings, illustrated in FIG. 2 is another embodiment of a mount 10 of the present invention wherein like elements are given same reference characters as the embodiment illustrated in FIG. 1. The embodiment illustrated in FIG. 2 differs from that shown in FIG. 1 by including a modified orifice plate 144. In particular, the orifice plate 144 includes an inertia track portion or passageway 154 in addition to, or in place of, the weep hole illustrated in FIG. 1. The inertia track 154 provides a passageway through the orifice plate 144 including a large length to diameter ratio. The inertia track 154 provides the hydraulic mount 10 with a means of providing hydraulic damping for high dynamic rigidity at high amplitude vibrations.

The inertia track 154 can include a first opening 180 in communication with the first chamber 46 and a second opening 182 in communication with the second chamber 48. The inertia track 154 can thus possess a cross sectional zigzag configuration. The passageway 154 can include a spiral configuration or any suitable configuration, but in one embodiment the inertia track 154 has a greater length to width ratio. The inertia track 154 can thus be tuned to control fluid moving between the upper and lower chambers 46, 48. As engine vibrations causes the mount 10 to move, fluid can move between upper and lower chambers 46, 48 through the inertia track 154. The fluid in the inertia track 154 can be designed to resonate at a particular operational frequency that can effectively dynamically control the mount 10 thereby reducing the vibration transmitted across the mount at or near resonance.

Figure 3:
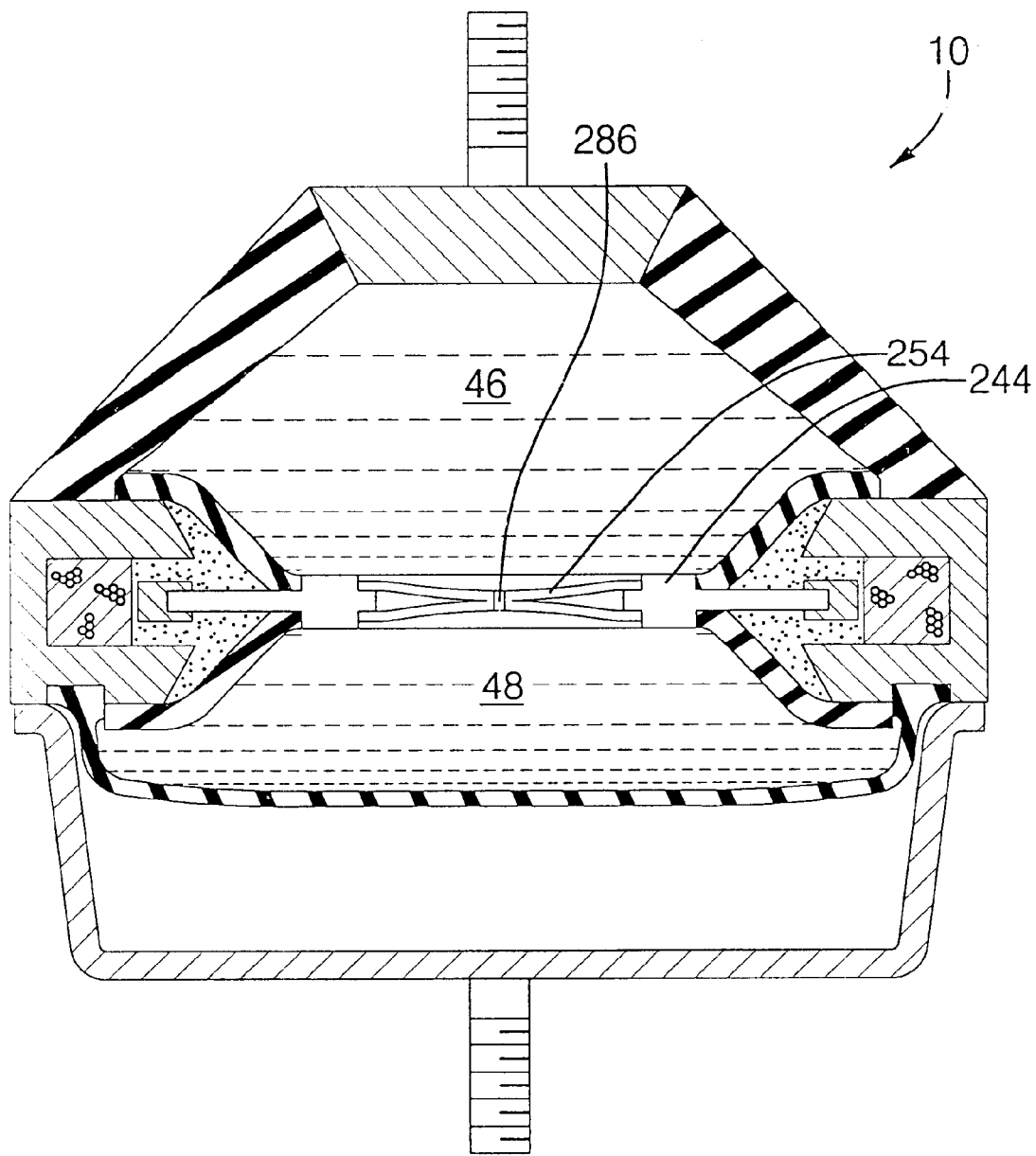
FIG. 3 illustrates a cross-sectional view of another embodiment of a MR mount of present invention.

Referring to the drawings, illustrated in FIG. 3 is another embodiment of a mount 10 of the present invention. The embodiment illustrated differs from that shown in FIG. 1 by including a modified orifice plate 244 comprising a control valve 254. In particular, the orifice plate 244 includes a passageway 284 for allowing fluid pass between the first chamber and the second chamber 46, 48. The orifice plate 544 further includes a movable valve member 254. The valve member 254 can be a passive valve, i.e., which reacts to changes in pressure. The valve member 254 can be actively controlled. The valve member 254 can be selectively enabled or disabled for permitting or inhibiting the fluid communication between the two chambers 46, 48 through the passageway 284.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A hydraulic mount assembly. comprising:
   a body Including a main chamber formed therein;
   a magnetorheological fluid retaining member positioned in the main chamber forming, a magnetorheological chamber adjacent the main chamber;
   an electrical coil positioned adjacent the magnetorheological chamber;
   a plate member operably connected to the magnetorheological fluid retaining member; and
   said plate member being positioned to separate the main chamber into a first subchamber and a second subchamber.

2. The assembly of claim 1 wherein the plate member includes a rim portion extending into the magnetorheological chamber.

3. The assembly of claim 2 wherein rim portion includes a metallic portion.

4. The assembly of claim 2 wherein said rim portion is spaced apart from the coil by a predetermined distance and cooperates with the coil to control a magnetic field generated by the coil when the coil is energized.

5. The assembly of claim 1 wherein the plate member includes a control valve, the control valve having an orifice in communication with the upper and lower sub-chambers.

6. The assembly of claim 5 wherein the control valve is one of a passive valve and an active valve.

7. The assembly of claim 5 wherein the orifice of the control valve is controllable to allow variable flow of mount fluid therethrough.

8. The assembly of claim 1 wherein the plate members includes a passageway formed therethrough in communication with the first and second subchambers, the passageway having a greater length than width.

9. A hydraulic mount assembly, comprising:
   a body including a main chamber formed therein;
   a magnetorheological fluid retaining member positioned in the main chamber forming a magnetorheological chamber adjacent the main chamber;
   an electrical coil positioned adjacent the magnetorheological chamber;
   a plate member operably connected to the magnetorheological fluid retaining member;
   said plate member includes a rim portion extending into said magnetorheological chamber;
   said rim portion includes a metallic portion;
   said rim portion is spaced apart from said coil by a predetermined distance and cooperates with said coil to control a magnetic field generated by said coil when said coil is energized; and
   said plate member is positioned to separate said main chamber into upper and lower sub-chambers.

10. The assembly of claim 9 wherein the plate member includes a valve to control fluid communication between the upper and lower sub-chambers.

11. The assembly of claim 10 wherein the valve is one of a passive valve and an actively controlled valve.

12. The assembly of claim 9 wherein the plate member includes an inertia track passageway formed therethrough to allow fluid communication between the upper and lower sub-chambers.

13. A hydraulic mount assembly, comprising:
a body including a main chamber formed therein;
a magnetorheological fluid retaining member positioned in the main chamber forming a magnetorheological chamber adjacent the main chamber;
an electrical coil positioned the magnetorheological chamber;
a plate member operably connected to said magnetorheological fluid retaining member; and said magnetorheological fluid retaining members includes an upper and lower skirt, each attached respectively to upper and lower surfaces of the plate member at one end, the upper and lower skirt attached to the body at the other end.

14. The assembly of claim 13 further comprising:
a ring member positioned along the body of the mount, the ring member including a groove formed in an inner surface thereof, the groove adapted to house the coil therein and position the coil adjacent the rim of the plate member.

15. The assembly of claim 14 wherein the upper and lower skirts respectively attach to upper and lower surfaces of the ring member.

16. The assembly of claim 15 wherein the magnetorheological chamber is formed between the upper and lower skirts and the ring member.

17. A hydraulic mount assembly, comprising:
a body including a main chamber formed therein;
magnetorheological fluid retaining member positioned in the main chamber forming a magnetorheological chamber adjacent to main chamber;
an electrical coil position adjacent the magnetorheological chamber;
a plate member operably connected to the magnetorheological fluid retaining member;
said plate member includes a passageway formed therethrough in communication with the upper and lower sub-chambers, the passageway having a greater length than width; and said passageway follows a tortuous path.

18. The assembly of claim 17 wherein the passageway is tunable to pull fluid therethrough at a predetermined resonance.

19. A hydraulic mount assembly comprising:
housing means for retaining non-magnetorheological mount fluid;
means for retaining non-magnetorheological mount fluid;
plate means for separating said non-magnetorheological mount fluid within the housing means; and
means for controlling the movement of the plate.

20. A method of controlling the movement of a hydraulic mount, comprising:
providing a main chamber and an annular chamber;
energizing and de-energizing a coil operably communicating with a magnetorheological fluid within said annular chamber in response to a sensed signal; and
controlling movement of a plate member contained within said main chamber and operably connected to said annular chamber.

21. A hydraulic mount assembly comprising:
a body having a main chamber, therein containing hydraulic mount fluid;
a magnetorheological fluid retaining member adjacent to the main chamber forming a magnetorheological chamber and containing magnetorheological fluid;
an electrical coil positioned adjacent to the magnetorheological chamber; and
a plate member operably connected to the magnetorheological fluid retaining member.

22. The hydraulic mount in claim 21, wherein said plate member is positioned to separate said main chamber into a first and a second subchamber.

23. A hydraulic mount assembly comprising:
a body having a main chamber formed therein;
a magnetorheological fluid retaining member adjacent to the main chamber forming a magnetorheological chamber;
an electrical coil positioned adjacent to the magnetorheological chamber; and
a plate member within the main chamber and operably connected to the magnetorheological fluid retaining member, said main chamber not operably connected to said magnetorheological chamber.

* * * * *